Dec. 4, 1962 R. W. W. SWEET 3,066,746
MULTIPLE GANG DISCER
Filed May 8, 1961 2 Sheets-Sheet 1
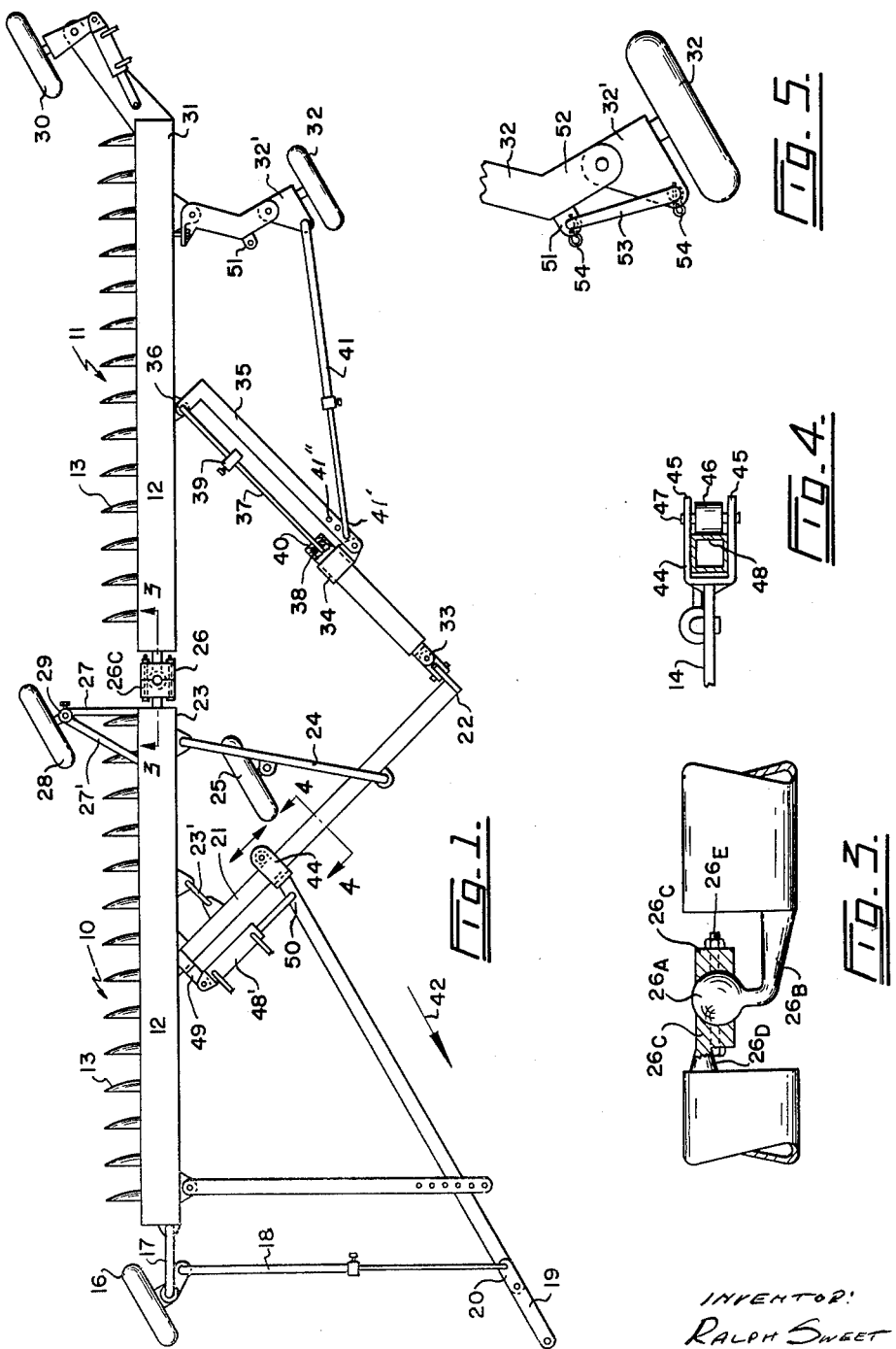
INVENTOR:
RALPH SWEET
BY
HIS ATTYS Dec. 4, 1962 R. W. W. SWEET 3,066,746
MULTIPLE GANG DISCER
Filed May 8, 1961 2 Sheets-Sheet 2
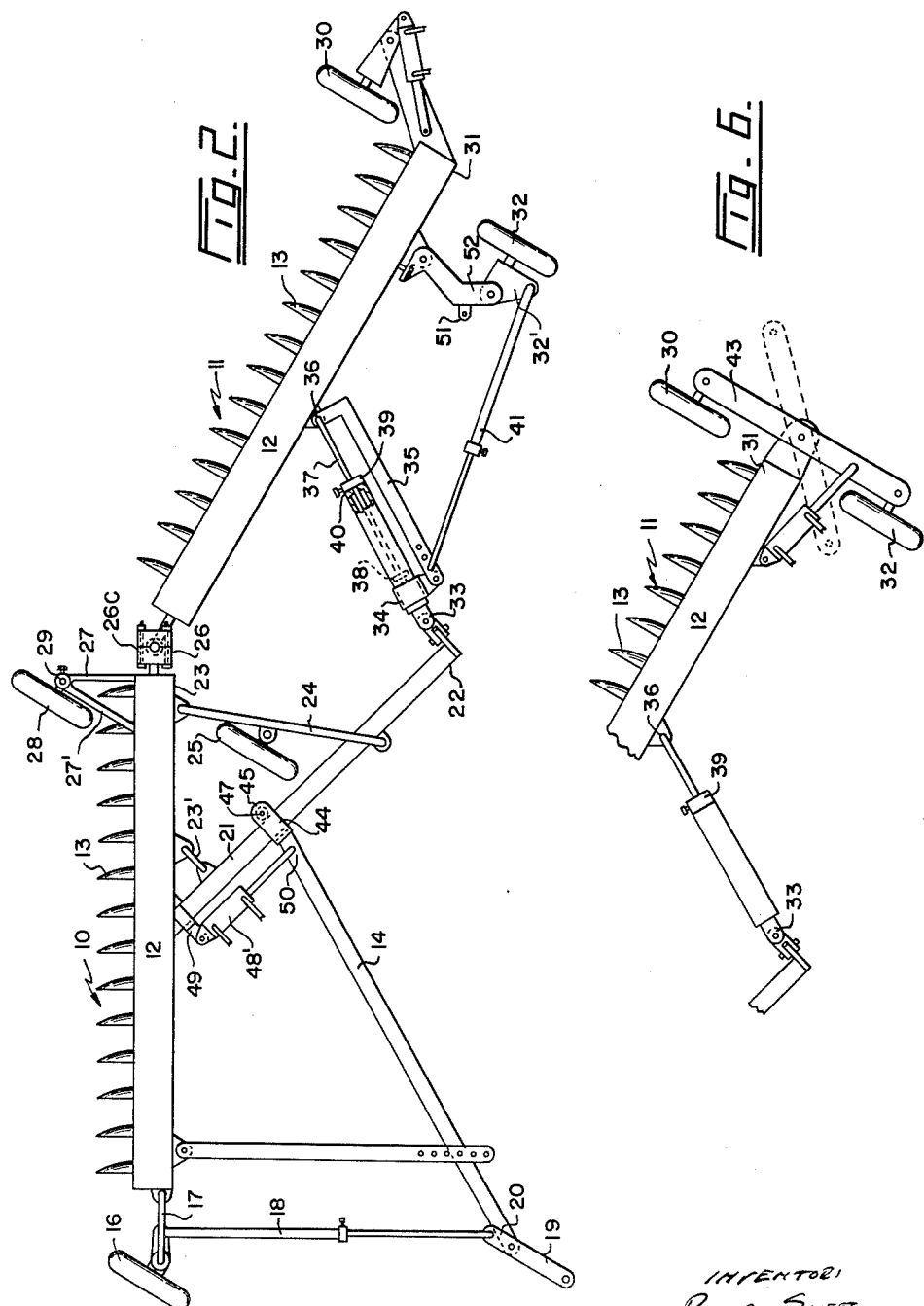

United States Patent Office 3,066,746
Patented Dec. 4, 1962

3,066,746
MULTIPLE GANG DISCER
Ralph Wesley Wilson Sweet, Forgan, Saskatchewan, Canada
Filed May 8, 1961, Ser. No. 108,367
18 Claims. (Cl. 172—284)

My invention relates to new and useful improvements in agricultural implements generally known as disc tillers.

However it is to be realized that the invention is readily adaptable for use with draft implement used in cultivation, harvesting or seeding the ground.

Relatively large farm tractors of 75 to 90 H.P. are being manufactured in order to supply adequate power for the large acreages that are being farmed these days.

However, one of the implements used on such farms is the discer, or disc tiller which has not increased in size to enable farmers to operate the large sized tractors efficiently.

Rather than pull one 15 foot disc tiller at 5 to 6 miles per hour with the disc plow bouncing along behind and working inefficiently, I have joined two 12 foot disc tillers together with a hinge in the center thus enabling these tractors to pull same at approximately 4 to 4½ miles per hour, which is the desired speed for such discing.

By doing this I have eliminated the complications of dual hook-ups, one disc tiller running over the other, hydraulic hoses breaking and the like. It is important when attaching two disc tillers in alignment to keep in mind three important points, namely, the two disc tillers must follow the contour of the soil, they must be pulled at the proper speed, and, due to the excessive width, they must have maneuverability particularly on cornering and when being transported.

In order to follow the contour of the soil, I have attached a caster wheel in front of the hinge and one to the rear of the hinge and for maneuverability I have designed a frame structure extending in front of the center caster wheel with a telescopic pipe fastened to same and to the center of the rear disc tiller thus enabling the front disc tiller to pivot at the hinge and turn ahead of the rear disc tiller eliminating stress on the hitch and frame and giving the maneuverability of a twelve foot machine on corners.

The principal object and essence of my invention is therefore to provide a disc tiller consisting of two disc gangs hinged together centrally and having caster wheels, back and front of the hinge together with frame structure extending forwardly of the caster wheels incorporating a telescopic pipe extending between the framework and approximately the center of the rear disc tiller.

Another object of my invention is to provide a device of the character herewithin described in which conventional disc tillers can be hooked up together in order to form my device, the hinge and associated structure being provided in kit form.

A yet further object of my invention is to provide a device of the character herewithin described which, with slight modifications, is suitable for varying types of land wheel steering structure.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a plan view of one embodiment of my device showing the two disc gangs or tillers in alignment.

FIGURE 2 is a view similar to FIGURE 1 but showing the device being turned by the towing tractor.

FIGURE 3 is an enlarged, fragmentary partial section of the hinge connection substantially on the line 3—3 of FIGURE 1.

FIGURE 4 is a section substantially along the line 4—4 of FIGURE 1.

FIGURE 5 is a fragmentary plan view of the land wheel assembly, showing the locking bar in position for transport position.

FIGURE 6 is a fragmentary view similar to FIGURE 2 but showing the alternative embodiment adapted for use with another type of land wheel structure.

In the drawings like characters of reference indicate corresponding parts in the different figures.

Proceeding therefore to describe my invention in detail, it will be observed from FIGURES 1 and 2 that I have utilized two disc gangs or tillers 10 and 11 (termed ground engaging units in the claims), each consisting of longitudinally extending supporting structure 12 carrying gangs of discs 13 mounted thereon in the conventional manner and adapted to be raised and lowered with relation to the framework by conventional hydraulic means.

A ground engaging wheel 16 is pivotally secured to the framework by means of brackets 17 and is connected by means of an adjustable telescopic link 18 to the main towing hitch 19 via link 20.

This main towing link extends rearwardly as at 14 and is adjustably secured to a diagonal frame member 21 which extends from approximately the center of the discer frame 10 diagonally forwardly to a point 22. The adjustability of this connection will be described subsequently.

A reverse U-shaped bar 24 is secured adjacent point 22 and adjacent the inner end 23 of the frame of the discer 10, said member 24 carrying a freely pivoting caster wheel 25 adapted to engage the ground. A brace 23' between the discer frame and the member 24 supplies rigidity to this structure.

The two discers 10 and 11 are joined together as at 26 by means of an universal joint thus permitting the discers to pivot in a vertical plane and also to pivot in a horizontal plane. This universal joint, shown in detail in FIGURE 3, comprises a ball 26A formed on the end of a rod 26B in turn secured to one end of the discer 11. A split bearing 26C surrounds the ball and is supported on a rod 26D secured to the adjacent end of the other discer 10. Bolts 26E pass through the split bearing halves and adjust the frictional engagement of the bearing 26C around the ball 26A.

The vertical plane pivoting permits the discer to maintain contact with the ground irrespective of the contour thereof whereas the pivoting in the horizontal plane permits turning of the device as will hereinafter be described.

Extending rearwardly from adjacent the junction of the two disc assemblies at 26 is a further member 27 braced by bar 27' carrying upon the end thereof a further freely pivoting caster wheel assembly 28. This caster wheel assembly is provided with an adjustable collar 29 thus permitting a certain amount of levelling of the rear of the device.

An hydraulically positionable rear furrow wheel assembly 30 is connected to the rear end 31 of the disc assembly 11 and a land wheel assembly 32 is pivotally connected to the frame 12 of the disc assembly 11 as clearly shown. The structure of the assembly 30 and the assembly 32 is similar to that shown in my United States Patent No. 2,982,363.

A tube 33 is universally pivotally attached to the point 22 of the member 21 and extends diagonally rearwardly towards the center of the frame 12 of the disc assembly 11. This tube 33 is supported within an adjustable guide sleeve 34 in turn supported upon one end of a bar 35 which in turn runs parallel to the tube 33 and is secured to the rear end 36 of a rod 37. This rod 37 is pivotally secured by end 36 to approximately the center of the frame 12 of the disc assembly 11 and is adapted to slide within the tube 33 within limits.

These limits are defined by a collar 38 welded to the rod 37 within the tube 33 and by an adjustable collar 39 slidable upon the rod 37 beyond the confines of the tube 33. The tube 33 is provided with an apertured end 40 which permits the rod to slide within the tube but prevents relative movement of the tube and rod due to the engagement with the end 40 of the collars 38 and 39.

Finally an adjustable telescopic link 41 extends between the pivoted wheel portion 32' of the land wheel steering assembly 32 and the bar 35 so that the land wheel is steered when the tube and rod assembly 33 and 37 is actuated. The adjustment of this telescopic bar provides the necessary toe-in for directional travel of the device. Also the end 41' is selectively engageable with one of a plurality of apertures 41" formed in the end of the bar 35 where it is secured to the sleeve 34 to provide coarse adjustment initially.

In operation, the device is drawn in the direction of arrow 42 and the collar 38 engages the end 40 of the tube thus preventing further elongation of the relationship of these two and by the necessary adjustments provided, this maintains the two disc gang sections in alignment as shown in FIGURE 1. The direction of the land wheel under these circumstances is set by positioning and adjusting the telescopic link 41.

If however, it is desired to turn the device as shown in FIGURE 2, it will be seen that the disc gang assembly 10 is pulled around on the pivot 26 as the structure comprising the frame 12, the members 21 and 24 form a rigid triangle thus causing the main towing bar 19 to pull the disc gang around as shown.

However, this causes the tube 33 to slide over rod 37 and causes the telescopic link 41 to turn the land wheel thus permitting the entire device to pivot easily until the tractor straightens out whereupon it takes up the position shown in FIGURE 1.

If the collar 39 is moved towards the collar 38, and locked in this position, then of course the angular relationship shown in FIGURE 2 is limited proportionately.

FIGURE 6 shows a simplified embodiment for use particularly with the type of land wheel assembly shown and indicated by the reference character 43. In this embodiment, it is merely necessary to provide the telescopic pipe assembly 35–40 inclusive without the necessity of the bar 35 or the telescopic link 41 as the land wheel assembly position is controlled hydraulically.

Referring back to the adjustable connection of the main towing link 14 to the diagonally frame member 21, I have provided a fork or bifurcated end 44 to the bar 14, said bifurcated end engaging around the bar 21 which is preferably of square cross section as illustrated in FIG. 4.

Between the ends 45 of the bifurcated end 44, I have journalled a roller 46 for rotation upon pin 47, said roller engaging the face 48 of the member 21 in order to assist in the movement of the bar 14 along the member 21. An hydraulical piston and cylinder assembly 48 extends between a bracket 49 secured to the framework 12 and the end 50 of the towing bar 14 adjacent the aforementioned bifurcated end.

It will therefore be seen that extension or retraction of the piston within the cylinder 48 will preset the position of the towing bar 14 along the length of the bar 21 within limits. The presetting of this position gives an adjustability to the line of draft of the machine when being pulled in the direction of arrow 42.

Reference should next be made to FIGURE 5 in which I have shown the land wheel assembly 32. When it is desired to transport the machine, it is necessary that the two sections 10 and 11 are maintained in alignment as per FIG. 1, and under these circumstances, it is necessary to disconnect the end of the telescopic link 41 from the pivoting wheel assembly 32' and to set this pivoting wheel section rigidly with respect to its mounting.

In this connection I provide an offstanding lug 51 from the main mounting bar 52 of the land wheel assembly and an inverted U-shaped link 53 which is adapted to engage an aperture within the lug 51 and the aperture in the portion 32' from which the end of the telescopic link 41 has been disengaged. Conventional pins 54 maintaining this link in position as shown in FIGURE 5 thus maintaining the desired direction of travel of the land wheel under transport conditions.

Although the foregoing describes the pair of discer sections pivotally connected together and having the necessary linkage in order to enable turns to be made readily and easily, nevertheless it will be appreciated that the scope of the invention also covers a kit which can be used with two conventional disc sections.

Such kits would contain the necessary linkage and attachments and also the joint 26 thus enabling an operator to convert two conventional discers into one multiple discer as described and illustrated.

If it is desired to simplify still further the assembly, then the necessary components could be secured to relatively short disc section ends which in turn could then be bolted to existing discer assemblies.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An agricultural device comprising in combination a pair of ground engaging units, means pivotally connecting said units together in alignment for limited movement in the horizontal and vertical planes, a front furrow wheel supporting the leading end of one of said units, and a rear furrow wheel supporting the trailing end of the other of said units, a hitch assembly for said device, said hitch assembly including a main draft bar, a telescopically adjustable link extending from said front furrow wheel to said main draft bar, a diagonal frame member secured by one end thereof to said one ground engaging unit and extending outwardly diagonally therefrom, means to brace said diagonal frame member to said one ground engaging unit, said main draft bar being adjustably secured to said diagonal frame member, adjustable telescopic linkage extending between the distal end of said diagonal frame member and said other ground engaging unit thereby controlling, within limits, the angular relationship between said ground engaging units when turning.

2. The device according to claim 1 which includes a caster wheel assembly mounted upon said means to brace said diagonal frame member.

3. The device according to claim 2 which includes a further caster wheel assembly mounted rearwardly of said pivotal connection between said ground engaging units.

4. The device according to claim 1 in which adjustable telescopic linkage includes a closed ended tube pivotally secured by one end thereof to the distal end of said diagonal frame member, a bar supported by one end thereof upon said other ground engaging unit and lying parallel to said tube, a sleeve surrounding said tube and being secured to said bar thereby supporting said tube for endwise movement within limits, within said sleeve, a rod passing freely through one closed end of said tube, means on the inner end of said rod to restrain same from disengagement from said tube, the other end of said rod being secured to said other ground engaging unit, and substantially parallel with said bar, and an adjustable collar on said rod outside of said tube to limit the retraction of said rod within said tube.

5. The device according to claim 2 in which adjustable telescopic linkage includes a closed ended tube pivotally secured by one end thereof to the distal end of said diagonal frame member, a bar supported by one end thereof upon said other ground engaging unit and lying parallel to said tube, a sleeve surrounding said tube and being secured to said bar thereby supporting said tube for endwise movement within limits, within said sleeve, a rod passing freely through one closed end of said tube, means on the inner end of said rod to restrain same from disengagement from said tube, the other end of said rod being secured to said other ground engaging unit, and substantially parallel with said bar, and an adjustable collar on said rod outside of said tube to limit the retraction of said rod within said tube.

6. The device according to claim 3 in which adjustable telescopic linkage includes a closed ended tube pivotally secured by one end thereof to the distal end of said diagonal frame member, a bar supported by one end thereof upon said other ground engaging unit and lying parallel to said tube, a sleeve surrounding said tube and being secured to said bar thereby supporting said tube for endwise movement within limits, within said sleeve, a rod passing freely through one closed end of said tube, means on the inner end of said rod to restrain same from disengagement from said tube, the other end of said rod being secured to said other ground engaging unit, and substantially parallel with said bar, and an adjustable collar on said rod outside of said tube to limit the retraction of said rod within said tube.

7. The device according to claim 4 which includes a land wheel assembly on the trailing end of said other ground engaging unit, a telescopic linkage extending between said land wheel assembly and said bar thereby controlling the position of said land wheel assembly within limits.

8. The device according to claim 5 which includes a land wheel assembly on the trailing end of said other ground engaging unit, a telescopic linkage extending between said land wheel assembly and said bar thereby controlling the position of said land wheel assembly within limits.

9. The device according to claim 6 which includes a land wheel assembly on the trailing end of said other ground engaging unit, a telescopic linkage extending between said land wheel assembly and said bar thereby controlling the position of said land wheel assembly within limits.

10. The device according to claim 1 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

11. The device according to claim 2 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

12. The device according to claim 3 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

13. The device according to claim 4 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

14. The device according to claim 5 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

15. The device according to claim 6 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

16. The device according to claim 7 which includes means to adjust the position of said main draft bar along said diagnoal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

17. The device according to claim 8 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

18. The device according to claim 9 which includes means to adjust the position of said main draft bar along said diagonal frame member thereby adjusting the draft of said device, said means including a bifurcated end on said main draft bar engaging around said diagonal frame member, roller means journalled between said bifurcated ends and engaging one side of said diagonal frame member, and hydraulic piston and cylinder means extending between said one ground engaging unit and said draft bar for positioning said draft bar along said diagonal frame member.

References Cited in the file of this patent
UNITED STATES PATENTS

| | | |
|---|---|---|
| 1,054,885 | Weiler | Mar. 4, 1913 |
| 1,068,570 | Danielsen | July 29, 1913 |
| 2,552,770 | l'Artenay | May 15, 1951 |